(12) United States Patent
Obermöller

(10) Patent No.: US 11,162,603 B2
(45) Date of Patent: Nov. 2, 2021

(54) VALVE TRAIN

(71) Applicant: KARL DUNGS GMBH & CO. KG, Urbach (DE)

(72) Inventor: Nils Obermöller, Schorndorf (DE)

(73) Assignee: KARL DUNGS GMBH & CO. KG, Urbach (DE)

( * ) Notice: Subject to any disclaimer, the term of this patent is extended or adjusted under 35 U.S.C. 154(b) by 260 days.

(21) Appl. No.: 16/084,142

(22) PCT Filed: Mar. 11, 2016

(86) PCT No.: PCT/EP2016/055365
§ 371 (c)(1),
(2) Date: Sep. 11, 2018

(87) PCT Pub. No.: WO2017/153002
PCT Pub. Date: Sep. 14, 2017

(65) Prior Publication Data
US 2020/0292095 A1    Sep. 17, 2020

(51) Int. Cl.
*H02P 27/06* (2006.01)
*F16K 31/04* (2006.01)
*H02M 7/04* (2006.01)

(52) U.S. Cl.
CPC ........ *F16K 31/046* (2013.01); *F23N 2235/10* (2020.01); *H02M 7/04* (2013.01); *H02P 27/06* (2013.01)

(58) Field of Classification Search
CPC .......... F16K 31/04; F16K 1/00; F16K 31/046; H02P 27/06; H02P 27/05; H02P 8/32
(Continued)

(56) References Cited

U.S. PATENT DOCUMENTS 3,685,790 A * 8/1972 Crowe ................ F16K 31/047
251/67
3,715,542 A * 2/1973 Grune ................ H01H 33/423
218/84
(Continued)

FOREIGN PATENT DOCUMENTS

CL    201802587    9/2018
CL    201802588    9/2018
(Continued)

OTHER PUBLICATIONS

International Search Report dated Aug. 30, 2016, for corresponding PCT Application No. PCT/EP2016/055365 (6 pgs.).
(Continued)

*Primary Examiner* — Rina I Duda
(74) *Attorney, Agent, or Firm* — Fitch, Even, Tabin & Flannery LLP

(57) ABSTRACT

A valve actuator (10) includes an electric motor (12) that opens, and also closes if need be, the valve via a gearing (15). A voltage supply device (19) has an input rectifier circuit and a buffer device (24) connected thereto, for example in the form of a capacitor C. From the voltage buffered by the capacitor C, a motor control circuit (25) obtains the energy for operating the electric motor (12). To prevent the valve (11) from being kept open too long after the voltage supply at the input (20) has been switched off, a switch-off device (34) is provided, which, after elimination of the voltage at the input (20), cuts off the energy flow from the voltage buffer device (24) to the electric motor (12).

15 Claims, 2 Drawing Sheets

(58) Field of Classification Search
USPC .................................... 251/129.11–129.13
See application file for complete search history.

(56) References Cited

U.S. PATENT DOCUMENTS

| | | | | |
|---|---|---|---|---|
| 3,981,632 | A * | 9/1976 | LeFebre | F04B 9/02 417/413.1 |
| 4,076,146 | A * | 2/1978 | Lausberg | A47L 15/0055 222/214 |
| 4,794,890 | A * | 1/1989 | Richeson, Jr. | H01F 7/1646 123/90.11 |
| 4,957,273 | A * | 9/1990 | Sears | F16K 31/02 251/129.04 |
| 5,040,569 | A * | 8/1991 | Nogami | B21B 37/62 137/625.21 |
| 5,287,048 | A * | 2/1994 | Lakin | F23N 5/245 318/459 |
| 5,485,341 | A | 1/1996 | Okado et al. | |
| 6,250,323 | B1 * | 6/2001 | Genga | F16K 31/046 137/1 |
| 6,290,207 | B1 * | 9/2001 | Genga | F16K 31/046 251/174 |
| 6,371,440 | B1 * | 4/2002 | Genga | F16K 31/046 251/129.03 |
| 7,023,163 | B2 * | 4/2006 | Charles | H02M 11/00 318/563 |
| 7,854,216 | B2 * | 12/2010 | Kasai | F02M 35/1017 123/336 |
| 8,136,789 | B2 * | 3/2012 | Staev | F16K 31/04 251/129.12 |
| 2005/0127854 | A1 | 6/2005 | Charles | |

FOREIGN PATENT DOCUMENTS

| | | |
|---|---|---|
| CN | 1089043 A | 7/1994 |
| CN | 1429424 A | 7/2003 |
| DE | 102009012405 A1 | 9/2010 |
| EP | 2228573 B1 | 11/2013 |
| EP | 3426956 A1 | 1/2019 |
| JP | 5-296361 A | 11/1993 |
| JP | H11280943 A | 10/1999 |
| JP | 2005-30439 A | 2/2005 |
| JP | 2006161855 A | 6/2006 |
| JP | 2008-92694 A | 4/2008 |
| JP | 2009-174975 A | 8/2009 |
| JP | 2012-26469 A | 2/2012 |
| JP | 2014-190525 A | 10/2014 |
| RU | 2237305 C1 | 9/2004 |
| WO | 2017153002 A1 | 9/2017 |

OTHER PUBLICATIONS

Edward J Hankey et al. "Improved input power conditioning for fractional horsepower shipboard valve actuators", Electric Ship Technologies Symposium, 2009, Piscataway, NJ, 484-490.

Shi Zhang et al. "The design of the intelligent electric actuator control system based on variable frequency", Industrial Electronics and Applications, 2013 8th IEEE Conference, 337-341.

Russian Decision to Grant dated Aug. 29, 2019, issued in corresponding Russian Patent Application No. 2018134802/07(057300) (12 pages).

Chilean Office Action dated Dec. 6, 2019, in corresponding Chilean Application No. 201802586, with English translation (17 pages).

Japanese Notice of Reasons for Refusal dated Oct. 25, 2019, in corresponding Japanese Application No. 2018-566629, with English translation (16 pages).

Chinese Office Action dated Aug. 29, 2019 and Search Report dated Aug. 19, 2019, in corresponding Chinese Application No. 201680083391.5, with English translation (20 pages).

Brazilian Office Action dated Sep. 1, 2020, in corresponding Brazilian Application No. BR112018067892-9, with machine English translation (9 pages).

Japanese Decision to Grant dated Aug. 4, 2020, in corresponding Japanese Application No. 2018-566629, with machine English translation (7 pages).

* cited by examiner

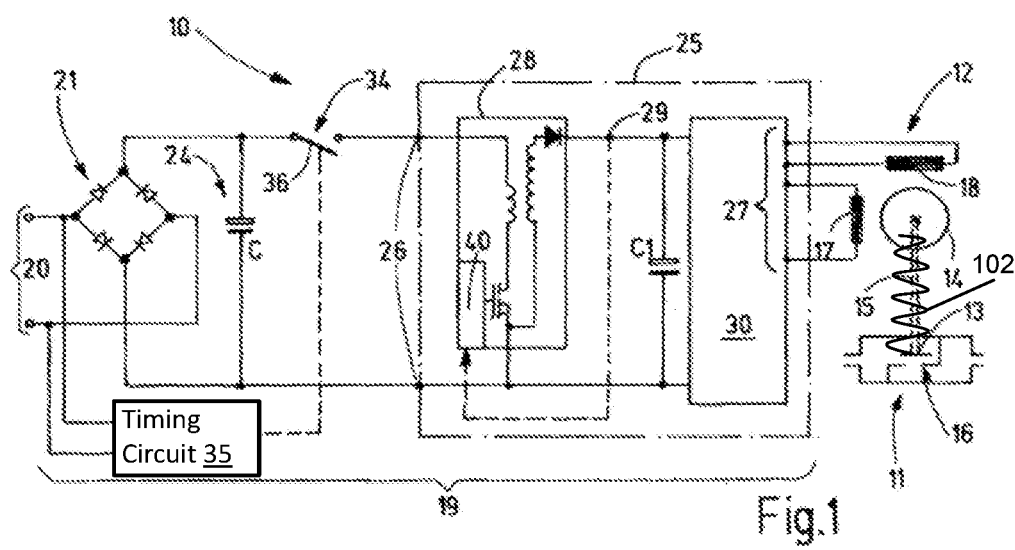
Fig.1
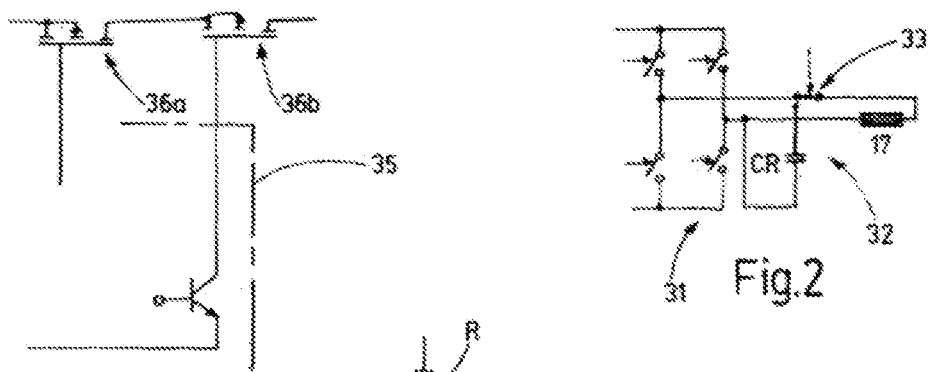
Fig.2
Fig.3
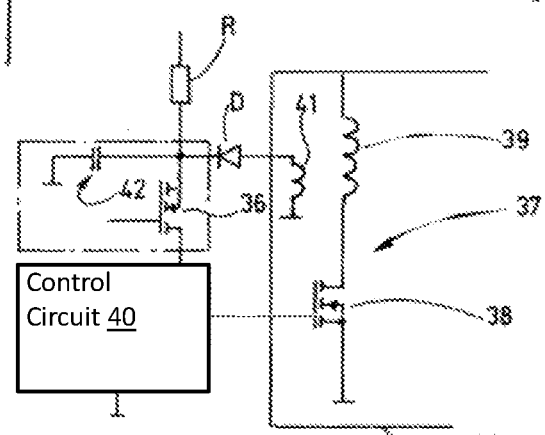
Fig.4

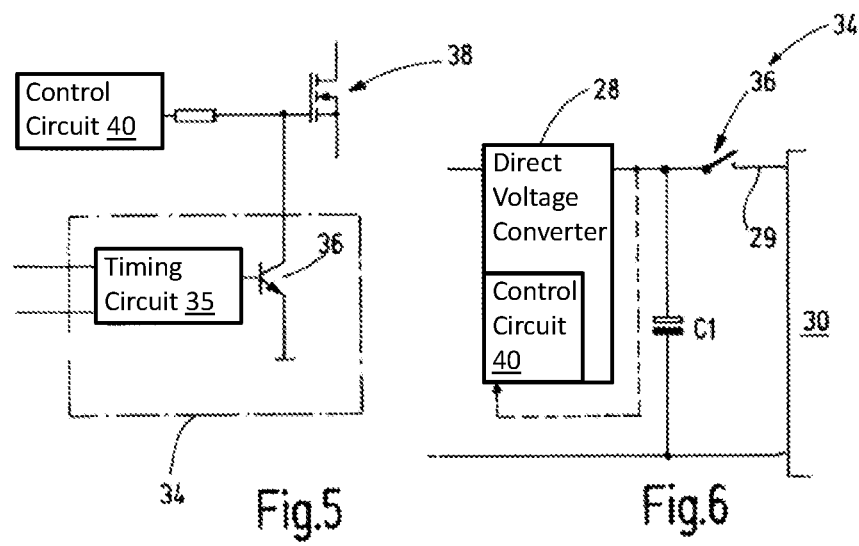
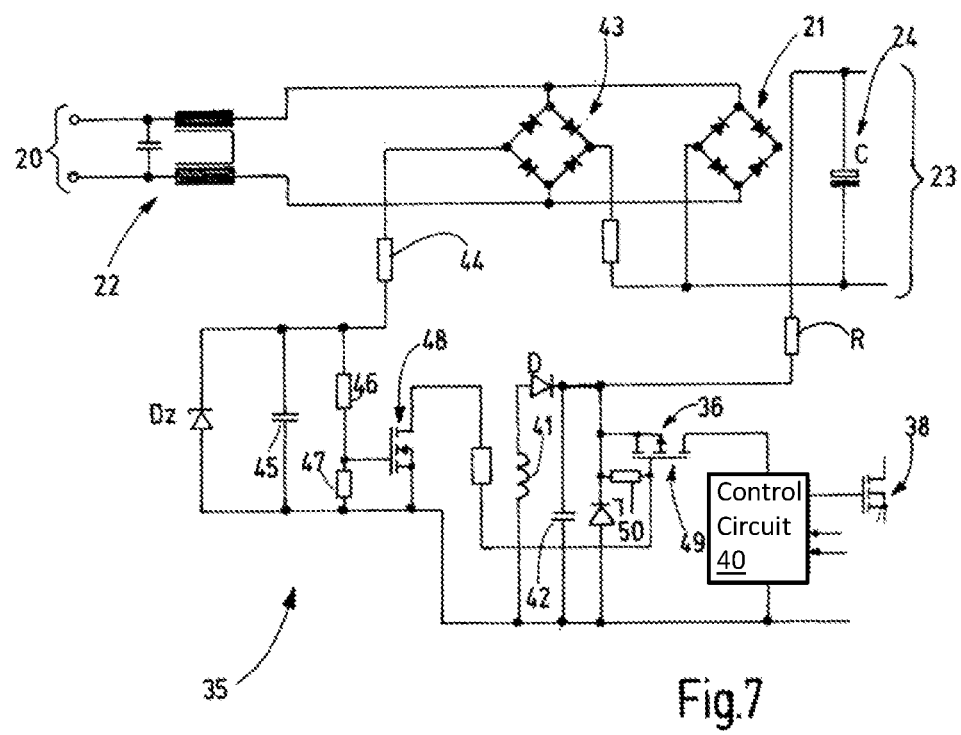

VALVE TRAIN

CROSS REFERENCE TO RELATED APPLICATIONS

This patent application is the national phase of PCT/EP2016/055365, filed Mar. 11, 2016.

TECHNICAL FIELD

The invention relates to a valve actuator which is suitable in general for valves, but in particular for gas valves having a safety shut-off function.

BACKGROUND

In principle, motorised control valves are known, including those in which a closing spring transfers the valve closure member into a closed position when the motor is currentless.

For example, DE 10 2009 012 405 A1 discloses a valve actuator in which the valve closure member is actuated by an electric motor via a gearing. This electric motor is formed as a stepper motor and is suitable for moving the valve closure member away from the valve seat against the force of a closing spring and holding said valve closure member in a certain position. The gearing is not self-locking, and therefore the closing spring can close the valve when the stepper motor is currentless.

In the sense of a broad application of given valve types, it is often also desired that valve actuators can be operated at variable voltages. For example, systems exist in which the valves are to be opened with a voltage of 100 V/60 Hz. Other systems use 230 V/50 Hz to open the valves. It is desired to be able to equip systems of this kind with uniform valves and valve actuators.

Especially in the case of gas valves having safety requirements, however, it must not only be ensured that the valve actually closes once the voltage has been switched off, but also in addition that the closing process is completed within a predefined period of time.

This results in the object of providing a valve actuator which on the one hand can be used in a broad voltage range for example of from 100 V to 230 V and which on the other hand makes it possible to observe given maximum closing times.

SUMMARY

The valve actuator according to the invention comprises an electric motor, which is connected to a valve closure member via a gearing. In addition, a closing spring is typically provided, which acts on the valve closure member in the closing direction. The valve is thus closed passively without motor drive—the electric motor is driven by the closing spring via the gearing at the time of the closing process. For active operation of the electric motor, a voltage supply device is provided, which comprises an input rectifier circuit with alternating voltage input and direct voltage output, with a voltage buffer device, for example in the form of a capacitor, for example an electrolytic capacitor, being connected to the direct voltage output of said input rectifier circuit. A motor control circuit for operating the electric motor is provided at the voltage buffer device. The motor control circuit generates control pulses for the electric motor from the direct voltage provided by the direct voltage buffer device, so as to rotate the electric motor in the opening direction or so as to hold said electric motor in a given position. The electric motor is preferably a multi-phase stepper motor. Its cogging torque is in any case so low that the closing spring can reliably overcome both the cogging torque and the friction present in the gearing.

The valve actuator further contains a switch-off device, which is designed to cut off the energy flow from the voltage buffer device to the motor within a fixed time interval after elimination of the voltage applied at the input rectifier circuit. This measure makes it possible to switch the electric motor to a currentless state, even if the voltage buffer device is not yet discharged or is not yet fully discharged. The possibility is thus created to design the voltage buffer device with a capacitance that is sufficient to bridge at least one mains half-wave, preferably a full mains period (for example 20 ms), at a minimal applied input voltage. On the other hand, the voltage buffer device contains so much energy in the event of a maximum applied voltage (for example 265 V), that the electric motor, via the motor control circuit, would remain in the open position longer than the desired maximum closing time following switch-off of the input voltage. By means of the switch-off device, a delayed closing of this kind of the valve as a result of high input voltage is avoided. The valve actuator according to the invention is thus particularly robust in respect of the processable input voltages—the closing response time of the valve is ensured within a given time interval (for example 80 ms) independently of the magnitude of the input voltage. This means that the valve starts the closing process, that is to say the valve closure member starts to move in the direction of the valve seat, within the closing response time.

The input rectifier circuit can be a bridge rectifier circuit, for example a Graetz bridge, at the output of which there is connected a capacitor as voltage buffer device. The motor control circuit connected to this capacitor comprises a corresponding direct voltage input and a motor winding output, to which for example two or more motor windings can be connected. The voltage buffer device smoothes the direct voltage delivered from the Graetz bridge, wherein the capacitance of the buffer device is greater than a minimum value, which is defined on the basis of the requirement to bridge at least one mains period or at least one mains half-wave at minimal voltage. The actual capacitance of the voltage buffer device can be a multiple of this minimum value.

The motor control circuit preferably contains a direct voltage converter on the input side, for example in the form of a flyback converter or another converter circuit, which feeds a DC link. An inverter is connected thereto and feeds the motor windings and preferably also adjusts the current therein. The DC link is preferably voltage-controlled, such that its voltage is substantially constant, provided the input voltage lies in the permissible range for example of 100-230 V, preferably plus tolerance. The voltage control can be provided by the direct voltage converter. To this end, said direct voltage converter can comprise a control circuitry, with a voltage sensor input, which is connected to the DC link. In addition, the control circuitry can comprise a current sensor input in order to monitor the current in the voltage converter and switch off said current in the event that a threshold is exceeded.

The motor control circuit can additionally contain a motor damping circuit for the generator operation of the motor. It can thus be ensured that the speed of the motor driven by the closing spring and running in generator operation is limited in order to limit the kinetic energy stored by the motor and so as not to close the valve too quickly. The damping circuit can be a resonance circuit, the resonance frequency of which lies above the frequency that occurs at the windings of the motor when said motor runs at the desired closing speed.

The switch-off device cuts off the energy flow from the voltage buffer device to the motor and preferably comprises at least one switch, preferably a normally closed contact. This switch is normally closed and only opens shortly after elimination of the feed voltage of the valve actuator. However, in order to bridge a mains failure, it must remain closed at least for a certain period of time, for example 20 ms, preferably longer, for example 40 ms. The normally closed contact can be disposed in the connection between the voltage buffer device and the motor control circuit. Alternatively, the normally closed contact can be housed in the DC link of the motor control circuit. Here, it preferably is disposed in turn behind a voltage buffer (capacitor), i.e. on the motor side thereof, which can be arranged in the voltage link. Alternatively, the switch can be provided at other points of the motor control circuit, for example on the direct voltage converter, in order to suppress operation thereof as soon as the switch receives a corresponding switch-off signal. For example, the switch can short-circuit control signals of a flyback converter switching element or can prevent the generation thereof. To this end, a control signal of the flyback converter control circuitry can be influenced, for example at the voltage sensor input or the current sensor input, for example in that the switch-off device feigns an overcurrent or an overvoltage at the corresponding current or voltage sensor input.

Alternatively, the switch of the switch-off device can be provided in order to switch off the operating voltage of the flyback converter control circuitry, to short circuit said flyback converter control circuitry, or to short circuit the DC link.

BRIEF DESCRIPTION OF THE DRAWINGS

Further details of advantageous embodiments of the invention will become clear from the drawing, the description, or the claims. In the drawings:

FIG. 1 shows the valve actuator according to the invention in the form of a simplified circuit diagram, FIG. 2 shows an optionally provided motor damping circuit for the generator operation thereof, FIG. 3 shows a switch-off device, in a detail of a simplified first embodiment, FIGS. 4, 5 and 6 show alternative embodiments of switch-off devices, in each case in a schematised detailed view, and FIG. 7 shows a more detailed view of the circuit of the valve actuator according to FIG. 4.

DETAILED DESCRIPTION

FIG. 1 shows a valve actuator 10 for a valve 11, which comprises at least one valve closure member 13 driven by an electric motor 12. The rotor 14 of the electric motor 12 is connected to the valve closure member 13 via a gearing 15, symbolised in FIG. 1 merely on the basis of two dashed lines, said gearing also including a closing spring 102, which preloads the valve closure member 13 in the closing direction, i.e. towards its valve seat 15. The electric motor 12 is preferably a stepper motor with at least two or also more windings 17, 18, which are connected to a voltage supply device 19. The electric motor 12 and the voltage supply device 19 together form the valve actuator 10, which can be attached to the valve 11 in a housing and can be controlled via an input 20. The input 20 is bipolar. If it is without voltage, the valve 11 is closed. When the input is energised, the valve 11 opens. Here, the input 20 is designed for input voltages for example of from 100 V to 240 V nominal voltage (i.e. it can be operated for example from 85 V to 265 V), such that the valve 11 is opened when a voltage within this range is applied to the input 20. By contrast, the valve 11 closes once this voltage is eliminated.

The voltage supply device 19, if the valve unit is intended for alternating voltage operation, includes an input rectifier circuit 21 as necessary, the alternating voltage input of which is connected to the input 20 via anti-interference and filter means 22 (FIG. 7) as necessary. The input rectifier circuit can be a bridge rectifier or the like. The input rectifier circuit, in the case of direct voltage operation, can also be replaced by a reverse polarity protection means in the form of at least one diode, which lies lengthwise in an input line. The reverse polarity protection means has a direct voltage input and a direct voltage output. Valve units for direct voltage operation can be designed for example for a voltage range of from 12 V to 36 V.

The direct voltage output of the input rectifier circuit 21 (or the reverse polarity protection means) is connected to a direct voltage circuit 23 (FIG. 7), which contains a voltage buffer device 24 for example in the form of an individual capacitor or a plurality of capacitors C. The voltage buffer device 24 is used to smooth the voltage in the direct voltage circuit 23, wherein it is preferably dimensioned such that it maintains the current supply of the electric motor 12 for at least one period of the input voltage at the lowest possible applied input voltage (for example 85 V or 100 V alternating voltage). The capacitor 24 to this end typically has a capacitance between 50 and 100 µF. However, it can also be higher.

The voltage buffer device 24 feeds a motor control circuit 25, which comprises a direct voltage input 26 connected to the voltage buffer device 24. On the output side, the motor control circuit comprises a motor winding output 27 with connections for the motor windings 17, 18. The motor control circuit 25 includes a direct voltage converter 28, which is connected to the direct voltage input 26 and on the output side feeds a DC link 29. This can in turn contain a buffer capacitor C1. The direct voltage converter 28 can be any suitable converter, for example a flyback converter.

The direct voltage of the DC link 29 is converted via an inverter 30 into the currents and voltages provided at the motor winding output 27. The inverter 30 can be any suitable inverter, for example a full-bridge inverter with a plurality of inverter bridges. FIG. 2 shows an inverter bridge 31 of this kind schematically for the motor winding 17. The inverter bridge 31 contains a plurality of electronic switches, for example four electronic switches, which are opened and closed such that the desired current flow is achieved in the motor winding 17. In addition, a damping circuit 32 can be provided, which contains a switchover means 33 and a resonance capacitor CR, in order to generate a speed-dependent braking effect in the case of generator operation of the motor 12. To this end, the switchover means 33 is switched such that the motor winding 17 and the resonance capacitor CR form a resonance circuit.

Similar damping circuits can be provided for a plurality of motor windings or for all motor windings.

The voltage supply device 19 includes a switch-off device 34, which is used to cut off the energy flow from the voltage buffer device 24 to the motor 12 once the input voltage has been switched off. The energy flow can be cut off here prior to the motor control circuit 25 or also within said circuit. The switch-off device is thus used to de-energise the motor windings 17, 18, regardless of a charge possibly stored in the voltage buffer device 24 when the input voltage is switched off at the input 20.

The switch-off device 34 includes a suitable switch 36, for example a relay contact or an electronic switch, for example a MOSFET transistor, which is controlled by the voltage applied at the input 20. To this end, a timing circuit 35 is used, which on the one hand is connected to the input 20 and on the other hand controls the switch 36 of the switch-off device 34.

The valve actuator 10 described in this regard operates as follows:

It is firstly assumed that no voltage has been applied at the input 20 for some time. The valve closure member 13 rests on the valve seat 16—the valve 11 is closed.

If a supply voltage lying within a predefined voltage range for example of from 85 V to 265 V (or also 12 V to 36 V) is now applied at the input 20, a direct voltage builds very quickly at the voltage buffer device 24 and is applied to the motor control circuit 25 via the closed switch 36. Said motor control circuit provides control pulses to the motor 12, such that said motor starts and opens the valve 11 against the force of the closing spring 102 and holds it in the open position.

If the valve 11 is now to be closed, the supply voltage applied at the input 20 is switched off (i.e. the input 20 is without voltage). The voltage provided by the voltage buffer device 24, however, initially continues to supply the motor control circuit 25, such that the motor 12 is initially still held in the open position. Once a holding time predefined by the timing circuit 35, for example of some tens of ms (for example 20 or 30 ms), the timing circuit 35 opens the switch 36, such that the motor control circuit 25 is currentless, regardless of the residual charge provided at the capacitor C. The windings 17, 18 are thus also currentless, and the rotor 14 of the motor 12 is now rotated backwards by the force of the closing spring. The valve closure member moves into the closed position.

During the closing process, the damping circuit 32 according to FIG. 2 can be activated in order to prevent the rotor 14 from adopting excessively high speeds. In this case, the capacitor CR is interconnected to the winding 17 or 18. The rotating rotor 14 excites the resonance circuit, wherein the current created therein inhibits the rotation of the rotor 14.

By means of the use of the switch-off device 34, the capacitor C of the voltage buffer device 24 is large, without the closure of the valve 11 being delayed beyond a permissible extent by the storage effect. In addition, it is achieved that the closure of the valve 11 is fixed uniformly regardless of the magnitude of the voltage applied at the input 20. In particular, delayed closure is avoided, as would occur otherwise with use of high input voltages on account of the resultant long discharge time of the voltage buffer device 24.

The switch 36 of the switch-off device 34 can be arranged as a normally closed contact in the connection line between the voltage buffer device 24 and the motor control circuit 25. As shown in FIG. 3, the switch 36 can be a transistor or also, if greater reliability is required, a series circuit of a plurality of transistors 36a, 36b.

It is also possible, however, to cut off the energy flow between the voltage buffer device 24 and the motor 12 at another point. FIG. 4 to this end shows an embodiment in which the direct voltage converter 28 has been shut down in order to cut off the energy flow. The direct voltage converter 28 by way of example can be formed as a flyback converter 37 with a switching element 38, which alternately releases and cuts off the current through a converter transformer 39. The switching element 38 is controlled by a control circuitry 40, which for its part requires a current supply. To this end, an auxiliary winding 41 is provided at the converter transformer 39. Current is conducted from said auxiliary winding via a diode D and as starting aid via a resistor R to a capacitor 42, which provides the operating voltage for the control circuit 40. The switch 36 releases the supply voltage for the control circuit 40 if the direct voltage converter 28 is to be operated and blocks the voltage, i.e. switches it off, when the direct voltage converter 28 should not deliver energy to the DC link 29.

The function of this circuit variant corresponds to that described in conjunction with FIG. 1. As soon as the operating voltage is switch off at the input 20, the timer 35 starts to run, so as to open the switch 36 once a predefined period of time Δt has elapsed and thus so as to suppress the energy flow from the voltage buffer device 24 to the motor 12 by shutting down the direct voltage converter 28.

A modified variant is shown in FIG. 5. In this figure, the switch 36 is provided in order to inhibit the control pulses of the switching element 38 as soon as the energy flow is to be cut off. Whereas the switch 36 was opened at the desired switch-off time in each of the previously described embodiments, it is closed in this case. It thus short circuits the control pulses conducted via the control signal line to the gate of the switching element 38 and suppresses the operation of the direct voltage converter 28, to which the switching element 38 belongs.

A further variant is shown in FIG. 6. There, the switch 36 belonging to the switch-off device 34 is provided in the DC link 29, wherein it is preferably arranged between the buffer capacitor C1 and the inverter 30. In this circuit variant the energy stored on the buffer capacitor C1 of the DC link 29 is also kept away from the inverter 30 from the moment of switch-off, such that said inverter for the present time ceases its operation and thus de-energises the motor 12.

FIG. 7 shows further details, in particular of the timer 35, on the basis of the exemplary embodiment according to FIG. 4, with reference being made to the description thereof in addition.

The timer 35 taps the supply voltage applied at the input 20. This timer is provided via a resistor 44 at a voltage-limiting Z-diode Dz and a capacitor 45 connected in parallel therewith. For reasons of safety and reliability, two or more capacitors 45 can also be connected in parallel with one another in all embodiments.

At least one discharge resistor is connected in parallel with the capacitor 45. In the present exemplary embodiment the discharge resistor is formed by a series connection of two resistors 46, 47, which form a voltage divider. By means of both the discharge current defined by the series connection and also the voltage divider ratio, the moment of switch-off of a transistor 48 connected by means of its gate to the voltage divider is determined, the source of which transistor is connected to ground, and the drain of which transistor is connected to the gate of the PMOS transistor 49, used as switch 36. This is conductive as long as the voltage at the gate of the transistor 48 exceeds a switching threshold. If, by contrast, the voltage lies below the switching threshold, the PMOS transistor 49 blocks, because its gate is connected to its source connection via a resistor 50. Alternatively, a bipolar transistor can be provided instead of the PMOS transistor.

It is noted that in all described embodiments a series connection of two or more semiconductor switches can also be provided instead of a single semiconductor switch, and doubling of their respective control devices, in particular their timing circuits 35, can be provided in order to increase the reliability. In all described embodiments, other switches can also be provided instead of semiconductor switches.

A valve actuator 10 that is in particular suited for gas valves 11 having safety shut-off function comprises an electric motor 12, in particular a stepper motor, that opens, and also closes if need be, the valve via a gearing 15. A voltage supply device 19, which is part of the valve actuator 10, is required for the operation of the electric motor 12. Said voltage supply device has an input rectifier circuit 21 and a buffer device 24 connected thereto, for example in the form of a capacitor C. From the voltage buffered by the capacitor C, a motor control circuit 25 obtains the energy for operating the electric motor 12.

In order to prevent the valve 11 from being kept open too long after the supply voltage at the input 20 has been switched off, a switch-off device 34 is provided, which, after elimination of the voltage at the input 20, cuts off the energy flow from the voltage buffer device 24 to the electric motor 12. The valve actuator can thus be designed for a very wide operating voltage range of, for example, 85 V to 265 V, wherein, regardless of the magnitude of the voltage used, a uniformly short switch-off time, i.e. valve closing time, is ensured.

| Reference signs: | |
|---|---|
| 10 | valve actuator |
| 11 | valve |
| 12 | electric motor/stepper motor |
| 13 | valve closure member |
| 14 | rotor |
| 15 | gearing |
| 16 | valve seat |
| 17, 18 | windings |
| 19 | voltage supply device |
| 20 | input |
| 21 | input rectifier circuitry |
| 22 | anti-interference and filter means |
| 23 | direct voltage circuit |
| 24 | voltage buffer device |
| C | capacitor |
| 25 | motor control circuit |
| 26 | direct voltage input |
| 27 | motor winding output |
| 28 | direct voltage converter |
| 29 | DC link |
| C1 | buffer capacitor |
| 30 | inverter |
| 31 | inverter bridge |
| 32 | damping circuit |
| 33 | switchover means |
| CR | resonance capacitor |
| 34 | switch-off device |
| 35 | timing circuit, timer |
| 36, 36a, 36b | switch, transistors |
| 37 | flyback converter |
| 38 | switching element |
| 39 | converter transformer |
| 40 | control circuit |
| 41 | auxiliary winding |
| D | diode |
| R | resistor |
| Δt | predefined period of time |
| 42 | capacitor |
| 43 | rectifier |
| 44 | resistor |
| Dz | Z-diode |
| 45 | capacitor |
| 46, 47 | resistors |
| 48 | transistor |
| 49 | P-MOS transistor |
| 50 | resistor |

The invention claimed is:

1. A valve actuator (10) comprising:
    an electric motor (12), which is connected to a valve closure member (13) via a gearing (15),
    a valve closing spring connected to bias the valve closure member (13) to a closed position and configured to drive the electric motor (12) when moving the valve closure member (13) to the closed position,
    a voltage supply device (19), comprising:
        an input rectifier circuit (21), which comprises an alternating or direct voltage input and a direct voltage output,
        a voltage buffer device (24) connected to the direct voltage output,
        a motor control circuit (25) for operation of the electric motor (12), and
        a switch-off device (34), which is designed to cut off energy flow from the voltage buffer device (24) to the electric motor (12) and de-energize motor windings (17, 18) of the motor (12) regardless of a charge stored in the voltage buffer device (24) within a defined time interval (Δt) after elimination of voltage applied at the input (20) to allow the valve closing spring to close the valve closure member (13).

2. The valve actuator according to claim 1, wherein the input rectifier circuit (21) comprises a bridge rectifier circuit or a reverse polarity protection diode.

3. The valve actuator according to claim 1, wherein the voltage buffer device (24) is a capacitor (C).

4. The valve actuator according to claim 1, wherein the voltage buffer device (24) comprises a buffer capacitance which is sufficient at least to bridge an input voltage period at minimal input voltage.

5. The valve actuator according to claim 1, wherein the motor control circuit (25) comprises a direct voltage input (26) and a motor winding output (27).

6. The valve actuator according to claim 5, wherein the motor control circuit (25) on an input side comprises a direct voltage converter (28), which feeds a DC link (29), and on a side of the motor winding output (27) comprises an inverter (30).

7. The valve actuator according to claim 6, wherein the direct voltage converter (28) is a switching converter.

8. The valve actuator according to claim 7, wherein the switching converter comprises a flyback converter comprising a control circuit (40) configured to control a flyback converter switching element (38).

9. The valve actuator according to claim 1, wherein the motor control circuit (25) on a side of a motor winding output (27) comprises a motor damping circuit (32) for generator operation of the electric motor (12).

10. The valve actuator according to claim 1, wherein the switch-off device (34) contains a timer (35), which is designed to generate a switch-off signal in response to elapse of the time interval (Δt).

11. The valve actuator according to claim 1, wherein the switch-off device (34) comprises a switch (36), which is arranged between the buffer device (24) and the motor control circuit (25).

12. The valve actuator according to claim 6, wherein the switch-off device (34) comprises a switch (36), which is arranged between the direct voltage converter (28) and the motor control circuit (30).

13. The valve actuator according to claim 8, wherein the switch-off device (34) comprises a switch (36), which is connected to the control circuitry (40) of the flyback converter switching element (38) to block operation thereof.

14. The valve actuator according to claim 6, wherein the switch-off device (34) comprises a switch (36) connected to a control signal line to control a flyback converter switching element (38).

15. The valve actuator according to claim 8, wherein the switch-off device (34) comprises a switch (36) connected to an operating voltage supply line of the control circuit (40) to control the flyback converter switching element (38).

* * * * *